United States Patent
Mizukami (10) Patent No.: US 12,088,143 B2
(45) Date of Patent: Sep. 10, 2024

(54) STATOR CORE AND MOTOR

(71) Applicant: Nidec Corporation, Kyoto (JP)

(72) Inventor: Junya Mizukami, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 169 days.

(21) Appl. No.: 17/915,131

(22) PCT Filed: Apr. 23, 2021

(86) PCT No.: PCT/JP2021/016508
§ 371 (c)(1),
(2) Date: Sep. 28, 2022

(87) PCT Pub. No.: WO2021/201301
PCT Pub. Date: Oct. 7, 2021

(65) Prior Publication Data
US 2023/0155428 A1     May 18, 2023

(30) Foreign Application Priority Data
Mar. 31, 2020   (JP) .................. 2020-064056

(51) Int. Cl.
*H02K 1/14* (2006.01)
*H02K 1/18* (2006.01)
*H02K 37/12* (2006.01)

(52) U.S. Cl.
CPC .............. *H02K 1/145* (2013.01); *H02K 1/187* (2013.01); *H02K 37/12* (2013.01)

(58) Field of Classification Search
CPC ...................................................... H02K 1/145
See application file for complete search history.

(56) References Cited

U.S. PATENT DOCUMENTS

2002/0180302 A1    12/2002   Takayuki et al.

FOREIGN PATENT DOCUMENTS

| JP | 58-127549 A | 7/1983 |
|----|----|----|
| JP | 03-218248 A | 9/1991 |
| JP | 2012-005161 A | 1/2012 |

OTHER PUBLICATIONS

Official Communication issued in International Patent Application No. PCT/JP2021/016508, mailed on Jul. 27, 2021.

*Primary Examiner* — Ramon M Barrera
(74) *Attorney, Agent, or Firm* — Keating & Bennett, LLP (57) ABSTRACT

A stator core of a motor includes a disk portion and a pole-tooth yoke. The disk portion has a disk shape that extends in a radial direction around a central axis extending in a vertical direction. The pole-tooth yoke is located along a radially outer end of the disk portion. The pole-tooth yoke includes an annular portion and a pole tooth. The annular portion is connected to the radially outer end of the disk portion and extends in a circumferential direction. The pole tooth protrudes to one axial side from the annular portion. The disk portion and the pole-tooth yoke are defined by different members.

12 Claims, 8 Drawing Sheets

STATOR CORE AND MOTOR

CROSS REFERENCE TO RELATED APPLICATIONS

This is a U.S. national stage of PCT Application No. PCT/JP2021/016508, filed on Apr. 23, 2021, and with priority under 35 U.S.C. § 119(a) and 35 U.S.C. § 365(b) being claimed from Japanese Application No. 2020-064056, filed Mar. 31, 2020, the entire disclosures of which are hereby incorporated herein by reference.

FIELD OF THE INVENTION

The present disclosure relates to a stator core and a motor.

BACKGROUND

In a claw-pole stepping motor, a stator yoke annularly constructed using a plurality of split yokes is known. In this stator yoke, a plurality of split yokes having pole teeth is arranged in the circumferential direction. Adjacent split yokes are connected and joined by a synthetic resin filled in a gap therebetween. For example, see JP 2012-5161 A.

However, in the above configuration, the number of parts increases according to the number of split cores, and the work of assembling the stator yoke becomes difficult. Therefore, the manufacturing process of the stator yoke becomes complicated, and the number of man-hours increases.

SUMMARY

Example embodiments of the present disclosure provide stator cores each with a simpler configuration.

A stator core according to an example embodiment of the present disclosure includes a disk portion and a pole-tooth yoke. The disk portion has a disk shape that extends in a radial direction around a central axis extending in a vertical direction. The pole-tooth yoke is located along a radially outer end of the disk portion. The pole-tooth yoke includes an annular portion and a pole tooth. The annular portion is connected to the radially outer end of the disk portion and extends in a circumferential direction. The pole tooth protrudes to one axial side from the annular portion. The disk portion and the pole-tooth yoke are defined by different members.

A motor according to an example embodiment of the present disclosure includes a stator including the above-described stator core and a rotor driven by the stator. The rotor includes a magnet located radially outward of the stator. The stator further includes a coil located radially inward of the pole tooth of the stator core. The coil opposes the magnet in the radial direction via the pole tooth.

According to the example embodiments of the stator cores and motors of the present disclosure, it is possible to provide a stator core having a simpler configuration.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described below with reference to the drawings.

In the present specification, in a motor 100, a direction parallel to a central axis CA is referred to by the term "axial direction", "axial", or "axially". In the axial direction, the direction from a flange part 402 of a holding member 400 to a hub 500, which will be described later, is referred to by the term "upper" or "upward", and the direction from the hub 500 to the flange part 402 is referred to by the term "lower" or "downward". In each component, an upper side end is referred to as an "upper end" and a lower side end is referred to as a "lower end". Further, regarding surfaces of each component, the surface facing upward is referred to as an "upper surface", and the surface facing downward is referred to as a "lower surface".

The direction orthogonal to the central axis CA is referred to by the term "radial direction", "radial", or "radially". In the radial direction, the direction toward the central axis CA is referred to by the term "radially inward", and the direction away from the central axis CA is referred to by the term "radially outward". In each component, a radially inward end is referred to as a "radially inner end", and a radially outward end is referred to as a "radially outer end". Further, regarding side surfaces of each component, the side surface directed radially inward is referred to as a "radially inner surface", and the side surface directed radially outward is referred to as a "radially outer surface".

The direction of rotation about the central axis CA is referred to by the term "circumferential direction", "circumferential", or "circumferentially. In each component, an end in the circumferential direction is referred to as a "circumferential end". Further, one end on a circumferentially one side is referred to as a "first circumferential side end", and an end on the circumferentially other side is referred to as a "second circumferential side end". In addition, regarding side surfaces of each component, a side surface directed in the circumferential direction is referred to as a "circumferential side surface". Further, the side surface directed to the circumferentially one side is referred to as a "circumferentially-one-side surface", and the side surface directed to the circumferentially other side is referred to as a "circumferentially-other-side surface".

Further, in a later-described stator core 340 that surrounds the central axis CA, a direction in which pole teeth 22 protrude from an annular portion 21 described later in the axial direction is referred to as an "axially one side Da", and the direction opposite to the axially one side is referred to as an "axially other side db". In components of the stator core 340, an end on the axially one side Da is referred to as an "axially-one-side end", and an end on the axially other side db is referred to as an "axially-other-side end". Further, regarding surfaces of the component of the stator core 340, the surface directed to the axially one side Da is referred to as an "axially-one-side end surface", and the surface directed to the axially other side db is referred to as an "axially-other-side end surface".

Further, in the present specification, an "annular shape" includes not only a shape continuously connected without any cut along the entire circumference in the circumferential direction around the central axis CA but also a shape having one or more cuts in a part of the entire circumference around the central axis CA. The "annular shape" also includes a shape having a closed curve on a curved surface that intersects with the central axis CA around the central axis CA.

In the positional relationship between any one of the azimuth, line, and plane and another one of them, the term "parallel" indicates not only a state in which they do not intersect at any point but also a state in which they are substantially parallel. The terms "vertical" and "orthogonal" indicate not only a state in which they intersect at 90 degrees with each other, but also a state in which they are substantially vertical and a state in which they are substantially orthogonal. That is, the terms "parallel", "vertical", and "orthogonal" each include a state in which the positional relationship between them has an angular deviation that does not depart from the gist of the present disclosure.

It should be noted that the matters described above are not strictly applied when incorporated in an actual device.

1. Example Embodiment

Figure 1:
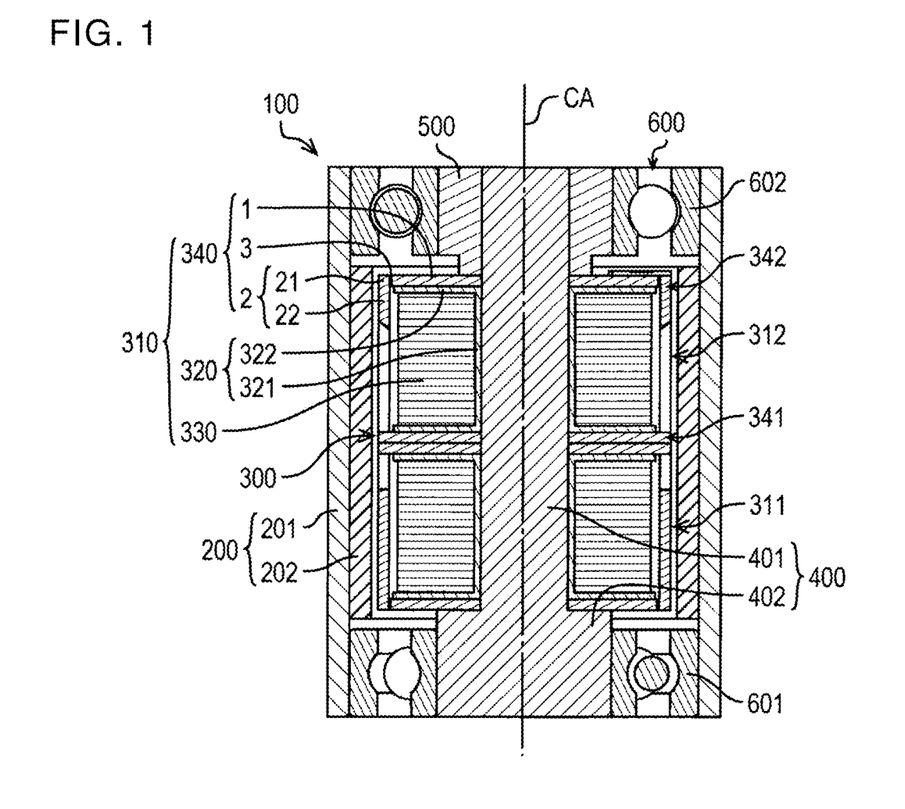
FIG. 1 is a sectional view showing a configuration example of a motor.

FIG. 1 is a sectional view showing a configuration example of the motor 100. Note that FIG. 1 shows the cross-sectional structure of the motor 100 when the motor 100 is cut on a virtual plane including the central axis CA.

1-1. Motor

The motor 100 is a claw-pole stepping motor in the present example embodiment. As shown in FIG. 1, the motor 100 includes a rotor 200, a stator 300, the holding member 400, the hub 500, and a bearing section 600.

The rotor 200 is driven by the stator 300. As described above, the motor 100 has the rotor 200. The rotor 200 is rotatable about the central axis CA that extends in the vertical direction. The rotor 200 has a case 201 and a magnet 202. The case 201 is a tubular magnetic material in the present example embodiment and holds the magnet 202. The case 201 can prevent a magnetic flux of the magnet 202 from leaking to the outside of the motor 100. The magnet 202 is disposed radially outward of the stator 300. As mentioned above, the rotor 200 has the magnet 202. The magnet 202 faces the stator 300 in the radial direction and is held on a radially inner surface of the case 201.

The stator 300 drives and rotates the rotor 200 by the magnetic flux generated when power is supplied. The stator 300 surrounds the central axis CA. As described above, the motor 100 includes the stator 300. In the present example embodiment, the stator 300 has an annular shape centered on the central axis CA. The configuration of the stator 300 will be described later.

The holding member 400 holds the stator 300. The holding member 400 has a columnar part 401 and the flange part 402. The columnar part 401 extends along the central axis CA in the axial direction. The stator 300 is fixed to a radially outer surface of the columnar part 401. The columnar part 401 is a columnar shaft which is a rotation axis of the rotor 200 in FIG. 1. However, the columnar part 401 is not limited to the example shown in FIG. 1. The columnar part 401 may be a tubular shaft or a tubular sleeve through which the columnar shaft passes. The flange part 402 extends radially outward from a lower end of the columnar part 401. The flange part 402 faces a lower end of the stator 300 in the axial direction.

The hub 500 has an annular shape that surrounds the columnar part 401. The hub 500 is disposed on an upper end of the columnar part 401. A radially inner end of the hub 500 is fixed to the radially outer surface of the columnar part 401. The hub 500 faces an upper end of the stator 300 in the axial direction.

The bearing section 600 includes a first bearing 601 and a second bearing 602.

A radially inner end of the first bearing 601 is connected to a radially outer portion of the flange part 402 of the holding member 400. A radially outer end of the first bearing 601 is connected to the radially inner surface of the case 201 at the lower end portion. The first bearing 601 rotatably connects the rotor 200 to the holding member 400 at the lower end portion of the motor 100.

The second bearing 602 is disposed above the first bearing 601. A radially inner end of the second bearing 602 is connected to a radially outer portion of the hub 500. A radially outer end of the second bearing 602 is connected to the radially inner surface of the case 201 at the upper end portion. The second bearing 602 rotatably connects the rotor 200 to the holding member 400 via the hub 500 at the upper end portion of the motor 100.

The first bearing 601 and the second bearing 602 are ball bearings in the present example embodiment. However, they are not limited thereto, and at least one of the first bearing 601 and the second bearing 602 may be another type of bearing such as a slide bearing.

1-2. Stator

Figure 2:
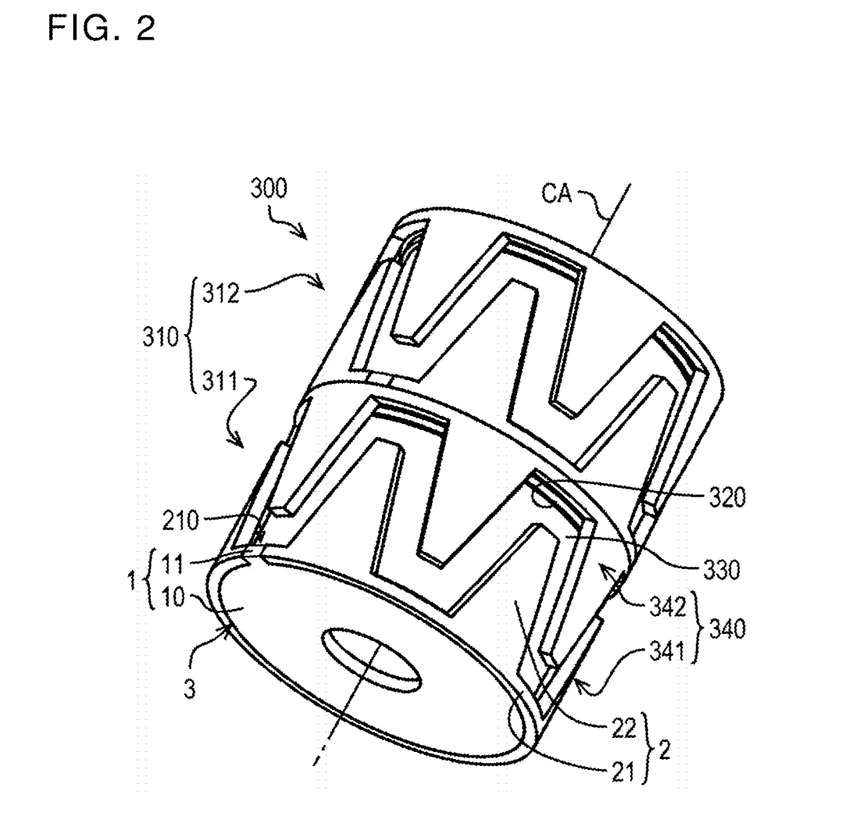
FIG. 2 is a perspective view of an exemplary stator according to an example embodiment of the present disclosure.
Figure 3:
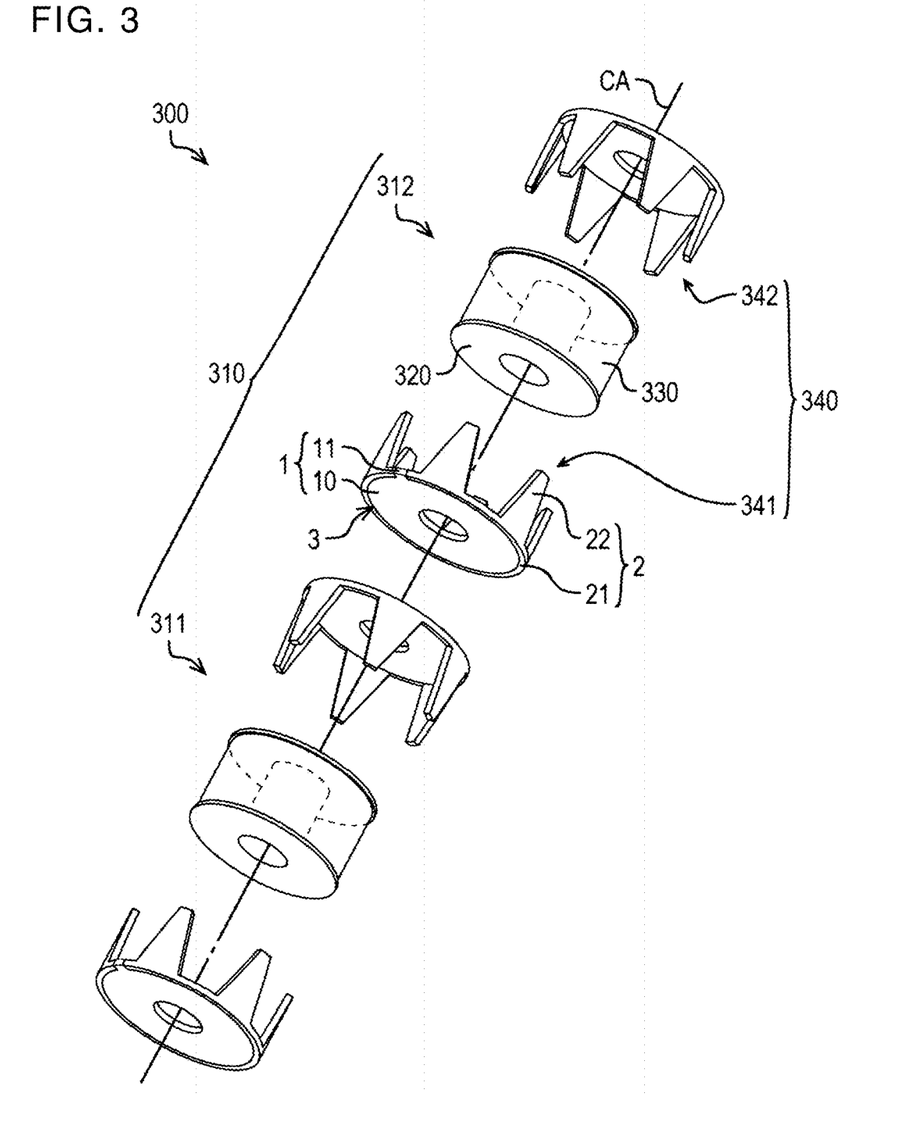
FIG. 3 is an exploded perspective view of an example embodiment of a stator according to the present disclosure.

Next, the stator 300 will be described with reference to FIGS. 2 and 3. FIG. 2 is a perspective view of the stator 300. FIG. 3 is an exploded perspective view of the stator 300.

The stator 300 has a plurality of stator sections 310 arranged in the axial direction. However, the stator 300 is not limited to the example in the present example embodiment, and may have a single stator section 310. The plurality of stator sections 310 includes a first stator part 311 and a second stator part 312 disposed above the first stator part 311. In the present example embodiment, the configurations of the first stator part 311 and the second stator part 312 are the same. Therefore, in the following, the configuration of each of the first stator part 311 and the second stator part 312 will be described as a configuration of the stator section 310.

The stator section 310 includes a bobbin 320, a coil 330, and the stator core 340.

The bobbin 320 has a cylindrical part 321 extending in the axial direction and a wall 322. The wall 322 extends in the radial direction from both ends of the cylindrical part 321 in the axial direction.

The coil 330 is a member in which a conductive wire is wound around a radially outer surface of the cylindrical part 321 of the bobbin 320 in the circumferential direction. The stator 300 includes the coil 330. The coil 330 is disposed radially inward of the later-described pole teeth 22 of the stator core 340, and faces the magnet 202 in the radial direction via the pole teeth 22.

The stator core 340 is a magnetic material and covers the bobbin 320 and the coil 330. The stator 300 includes the stator core 340. The stator core 340 has a first stator core 341 and a second stator core 342. In the present example embodiment, the configurations of the first stator core 341 and the second stator core 342 are the same except that the first stator core 341 is vertically inverted. Therefore, in the following, the configuration of each of the first stator core 341 and the second stator core 342 will be described as a configuration of the stator core 340.

1-2-1. Stator Core

Figure 4A:
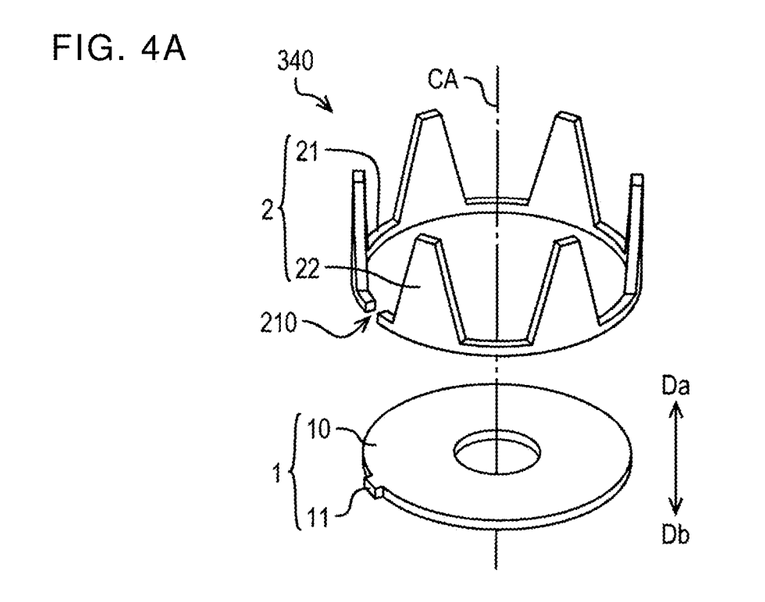
FIG. 4A is an exploded perspective view of a stator core according to an example embodiment of the present disclosure.
Figure 4B:
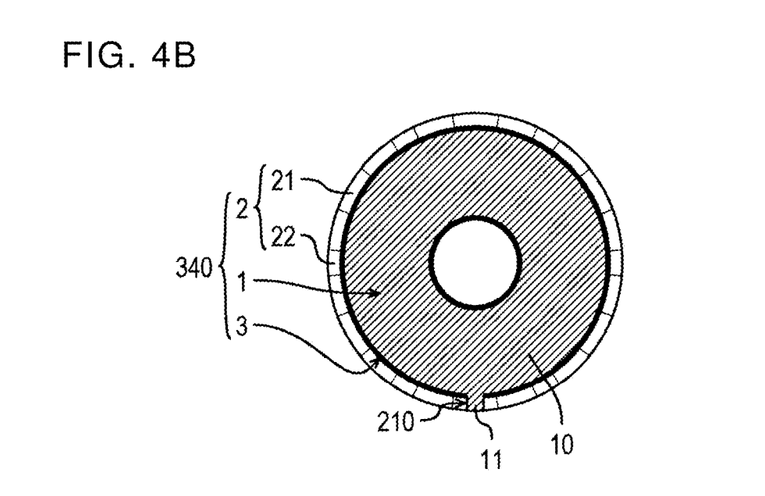
FIG. 4B is a top view of the stator core according to an example embodiment of the present disclosure.

The configuration of the stator core 340 will be described with reference to FIGS. 2 to 4B. FIG. 4A is an exploded perspective view of the stator core 340 according to the example embodiment. FIG. 4B is a top view of the stator core 340 according to the example embodiment.

The stator core 340 has a disk portion 1, a pole-tooth yoke 2, and a joint portion 3.

The disk portion 1 has a disk shape that extends in the radial direction around the central axis CA extending in the vertical direction. As described above, the stator core 340 has the disk portion 1. An opening (no reference sign given) through which the columnar part 401 of the holding member 400 is inserted is formed in the center of the disk portion 1 in the direction perpendicular to the axial direction. The disk portion 1 of the first stator core 341 is disposed below the bobbin 320 and the coil 330, and covers the lower surface of the bobbin 320. The disk portion 1 of the second stator core 342 is disposed above the bobbin 320 and the coil 330, and covers the upper surface of the bobbin 320.

The disk portion 1 has a first protrusion 11. The first protrusion 11 protrudes radially outward at the radially outer end of the disk portion 1. More specifically, the disk portion 1 further includes a disk body 10 that surrounds the central axis CA and extends in the radial direction. The first protrusion 11 extends radially outward from a radially outer surface of the disk body 10.

The pole-tooth yoke 2 is disposed along the radially outer end of the disk portion 1. As described above, the stator core 340 includes the pole-tooth yoke 2. The pole-tooth yoke 2 has the annular portion 21 and the pole teeth 22. The annular portion 21 is connected to the radially outer end of the disk portion 1 and extends in the circumferential direction. The pole teeth 22 protrude to the axially one side Da from the annular portion 21. For example, the annular portion 21 is disposed in the circumferential direction along the radially outer surface of the disk body 10. The radially inner end of the annular portion 21 is connected to the radially outer surface of the disk body 10. Further, in the first stator core 341, the pole teeth 22 protrude upward from the radially outer end of the disk portion 1. In the second stator core 342, pole teeth 232 protrude downward from the radially outer end of a disk portion 231. Further, the pole teeth 22 are disposed radially outward of the bobbin 320 and the coil 330, and cover at least the radially outer end of the coil 330. In the present example embodiment, the pole-tooth yoke 2 has a plurality of pole teeth 22. The plurality of pole teeth 22 is arranged in the circumferential direction along the radially outer end of the disk portion 1. In the circumferential direction, the pole teeth 22 of the first stator core 341 and the pole teeth 22 of the second stator core 342 are alternately arranged.

The disk portion 1 and the pole-tooth yoke 2 are different members. For example, members obtained by separately punching an electromagnetic steel plate can be used for the disk portion 1 and the pole-tooth yoke 2. The pole-tooth yoke 2, which is a member different from the disk portion 1, is placed along and connected to the radially outer end of the disk portion 1, whereby the stator core 340 in which the pole teeth 22 protrude to the axially one side Da can be obtained. The stator core 340 can be manufactured with a simpler configuration than a configuration in which a stator core is manufactured by, for example, combining multiple split cores. Therefore, the stator core 340 having a simple structure can be provided, and the number of parts of the stator core 340 can be further reduced.

The joint portion 3 is a portion of the stator core 340 where the disk portion 1 and the pole-tooth yoke 2 are joined. In the present example embodiment, the joint portion 3 is a welding mark formed by joining the annular portion 21 of the pole-tooth yoke 2 to the radially outer end of the disk portion 1 by welding. Due to welding between the disk portion 1 and the annular portion 21, the pole-tooth yoke 2 can be more reliably fixed to the radially outer end of the disk portion 1. Note that the method for joining the disk portion 1 and the annular portion 21 is not limited to the method described in the present example embodiment. For example, the annular portion 21 may be joined to the radially outer end of the disk portion 1 by brazing. That is, the joint portion 3 may be a brazing material used for brazing the annular portion 21 to the radially outer end of the disk portion 1. For example, any of a silver brazing material, a copper brazing material, an aluminum brazing material, a nickel brazing material, etc. can be used as the brazing material.

As shown in FIGS. 4A and 4B, the pole-tooth yoke 2 has an annular shape surrounding the central axis CA while being joined to the radially outer end of the disk portion 1. Here, the circumferential length of the radially inner end of the annular portion 21 is shorter than that of the radially outer end of the disk portion 1. Therefore, the pole-tooth yoke 2 has a gap 210 in the circumferential direction. The gap 210 is formed between a first circumferential side end and a second circumferential side end of the annular portion 21. Thus, even if there is a variation in the circumferential length of the annular portion 21, the radially inner end of the annular portion 21 can be more reliably brought into contact with the radially outer end of the disk portion 1. On the other hand, suppose the case where the first circumferential side end of the annular portion 21 contacts the second circumferential side end. In that case, when the circumferential length of the radially inner end of the annular portion is equal to or greater than the circumferential length of the radially outer end of the disk portion 1 due to a dimensional variation, the pole-tooth yoke 2 may not be disposed along the radially outer end of the disk portion 1. For example, a gap may be formed between the radially outer end of the disk portion 1 and the radially inner end of the annular portion 21.

As shown in FIG. 4B, the first protrusion 11 of the disk portion 1 is placed in the gap 210. In this case, it is preferable that at least one of the first circumferential side end and the second circumferential side end of the annular portion 21 contacts a circumferential end of the first protrusion 11. With this configuration, the position of the annular portion 21 with respect to the disk portion 1 is determined in the circumferential direction, whereby the pole teeth 22 can be positioned with respect to the disk portion 1 in the circumferential direction. Further, when both ends of the first protrusion 11 in the circumferential direction are in contact with the first circumferential side end and the second circumferential side end of the annular portion 21, respectively, the movement of the pole-tooth yoke 2 with respect to the disk portion 1 in the circumferential direction can be prevented. That is, circumferential stress exerted on the joint portion 3 can be reduced by fitting the first protrusion 11 into the gap 210.

1-3. Modifications of Stator Core

Next, first to fourth modifications of the stator core 340 will be described. In the following, configurations different from the configuration in the abovementioned example embodiment will be described. Further, the same components as those in the abovementioned example embodiment are designated by the same reference numerals, and the description thereof may be omitted.

1-3-1. First Modification

Figure 5A:
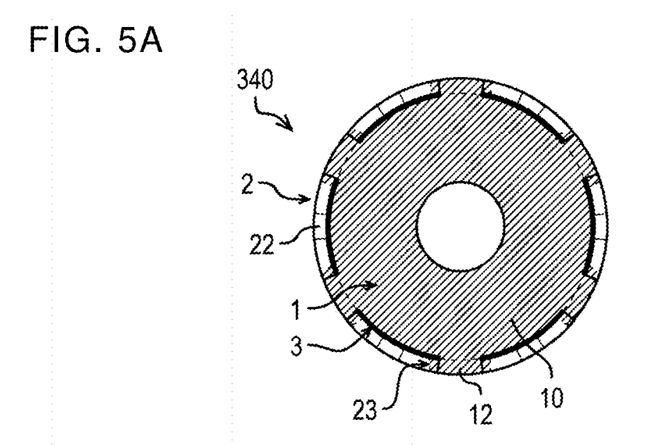
FIG. 5A is a top view of a stator core according to a first modification of an example embodiment of the present disclosure.
Figure 5B:
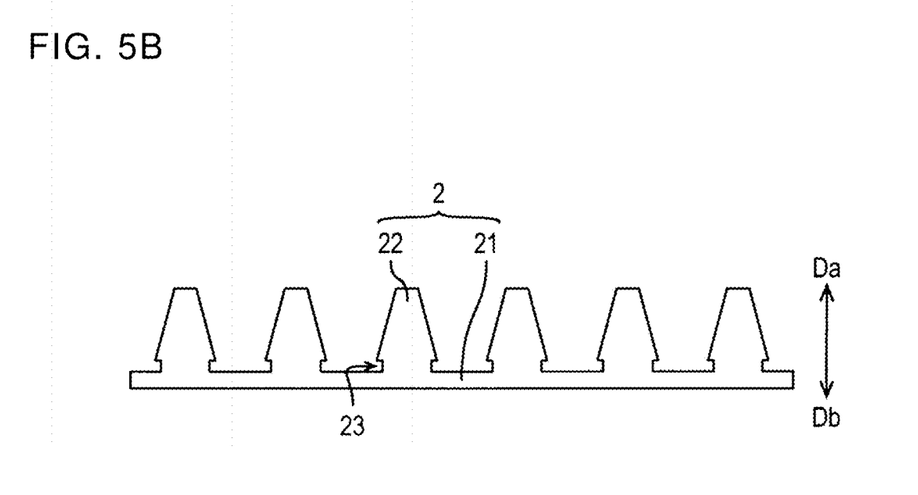
FIG. 5B is a developed view of a pole-tooth yoke according to the first modification.

The first modification of the stator core 340 will be described with reference to FIGS. 5A and 5B. FIG. 5A is a top view of the stator core 340 according to the first modification. FIG. 5B is a developed view of the pole-tooth yoke 2 according to the first modification.

In the first modification, the disk portion 1 has a second protrusion 12. The second protrusion 12 protrudes radially outward at the radially outer end of the disk portion 1. More specifically, the second protrusion 12 extends radially outward from the radially outer surface of the disk body 10. The disk portion 1 has a plurality of second protrusions 12 arranged in the circumferential direction. The number of the second protrusions 12 is six in FIGS. 5A and 5B. However, it is not limited to the example shown in FIGS. 5A and 5B, and the number of the second protrusions 12 may be one, or two or more except for six.

The pole-tooth yoke 2 has the plurality of pole teeth 22 arranged in the circumferential direction. Each of the second protrusions 12 is disposed in a region between the pole teeth 22 adjacent to each other in the circumferential direction. With this configuration, the movement of the pole-tooth yoke 2 relative to the disk portion 1 in the circumferential direction can be more effectively suppressed or prevented.

The second protrusions 12 are placed in all regions between the adjacent pole teeth 22 in the circumferential direction in FIGS. 5A and 5B. However, the present disclosure is not limited to the example shown in FIGS. 5A and 5B, and it is only sufficient that the second protrusion 12 is placed in at least one of the regions between the adjacent pole teeth 22 in the circumferential direction.

Preferably, the pole-tooth yoke 2 has pole-tooth recesses 23 as shown in FIGS. 5A and 5B. The pole-tooth recess 23 is recessed in the circumferential direction at the circumferential end of each of the pole teeth 22. The circumferential end of the second protrusion 12 fits into the pole-tooth recess 23. With this configuration, the circumferential end of the second protrusion 12 can be fixed to the pole-tooth recess 23 by engagement. Therefore, the fixing strength between the disk portion 1 and the pole-tooth yoke 2 can be increased.

Further, the second protrusions 12 are preferably formed at the axially-one-side end of the disk portion 1 on the radially outer surface of the disk portion 1. Further, the pole-tooth recesses 23 are formed at the circumferential ends on the axially-other-side ends of the pole teeth 22 (that is, at the roots of the pole teeth 22). With this configuration, the position of the axially-other-side end of the disk portion 1 in the axial direction can be brought closer to the position of the axially-other-side end of the pole-tooth yoke 2 in the axial direction. That is, the axially-other-side end of the stator core 340 can be further flattened.

The pole-tooth recesses 23 are formed at both ends of the pole teeth 22 in the circumferential direction in FIGS. 5A and 5B. However, the present disclosure is not limited to this example, and the pole-tooth recesses 23 may be formed at the first circumferential side ends of the pole teeth 22 without being formed at the second circumferential side ends of the pole teeth 22. The pole-tooth recess 23 is formed in each pole tooth 22 in FIGS. 5A and 5B. However, the present disclosure is not limited to this example, and the pole-tooth recess 23 may be formed in at least one of the pole teeth 22.

1-3-2. Second Modification

Figure 6A:
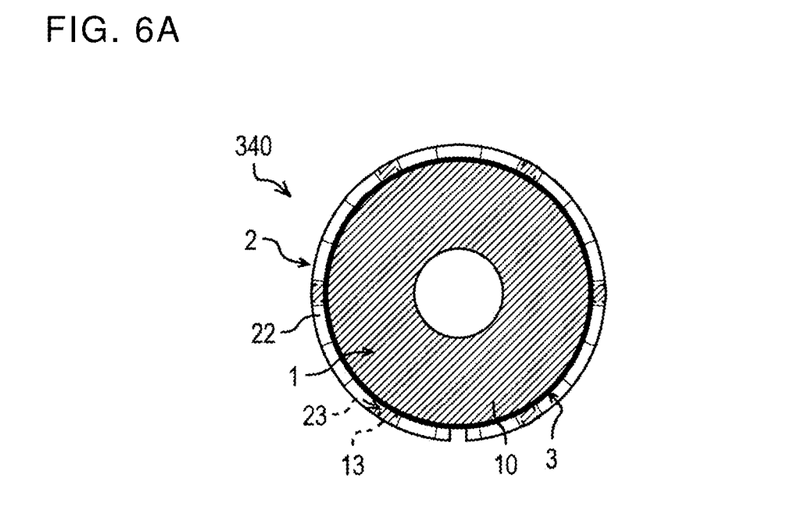
FIG. 6A is a top view of a stator core according to a second modification of an example embodiment of the present disclosure.
Figure 6B:
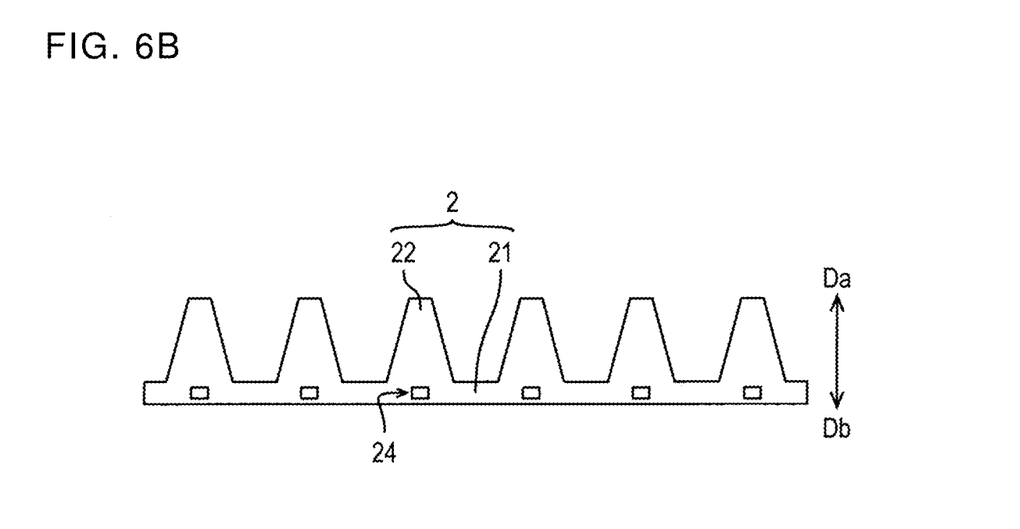
FIG. 6B is a developed view of a pole-tooth yoke according to the second modification.

The second modification of the stator core 340 will be described with reference to FIGS. 6A and 6B. FIG. 6A is a top view of the stator core 340 according to the second modification. FIG. 6B is a developed view of the pole-tooth yoke 2 according to the second modification.

In the second modification, the disk portion 1 has a third protrusion 13. The third protrusion 13 protrudes radially outward at the radially outer end of the disk portion 1. More specifically, the third protrusion 13 extends radially outward from the radially outer surface of the disk body 10. The disk portion 1 has a plurality of third protrusions 13 arranged in the circumferential direction. The number of the third protrusions 13 is six in FIGS. 6A and 6B. However, it is not limited to the example shown in FIGS. 6A and 6B, and the number of the third protrusions 13 may be one, or two or more except for six.

The annular portion 21 of the pole-tooth yoke 2 has holes 24. In the second modification, the holes 24 pass through the annular portion 21 in the radial direction. However, the present disclosure is not limited to this example, and the holes 24 may be recessed radially outward at the radially inner end of the annular portion 21.

The third protrusions 13 fit into the holes 24. With this configuration, when the annular portion 21 is joined to the disk portion 1, the third protrusions 13 fit into the holes 24, so that the annular portion 21 can be more reliably positioned in the circumferential direction with respect to the disk portion 1. Further, the third protrusions 13 can be fixed to the annular portion 21 by engagement between the third protrusions 13 and the holes 24. Therefore, the fixing strength between the disk portion 1 and the pole-tooth yoke 2 can be increased.

Preferably, the holes 24 overlap the pole teeth 22 as viewed in the axial direction. For example, as viewed in the axial direction, each hole 24 is formed on the circumferentially other side with respect to the first circumferential side end of the corresponding pole tooth 22 and on the circumferentially one side with respect to the second circumferential side end of the pole tooth 22. More preferably, the holes 24 overlap the tips of the pole teeth 22 as viewed in the axial direction. Due to the holes 24 being formed at positions including the pole teeth 22 in the circumferential direction, the width in the axial direction between the axially-one-side ends of the holes 24 and the axially-one-side end of the pole-tooth yoke 2 can be further increased. Therefore, a decrease in strength of the pole-tooth yoke 2 due to the formation of the holes 24 in the annular portion 21 can be suppressed.

In FIG. 6A and FIG. 6B, the holes 24 are formed at all positions overlapping the pole teeth 22 in the circumferential direction, as viewed in the axial direction. However, the present disclosure is not limited to the example shown in FIGS. 6A and 6B, and the hole 24 may be formed on at least one of the positions overlapping the pole teeth 22 in the circumferential direction, as viewed in the axial direction.

1-3-3. Third Modification

Figure 7A:
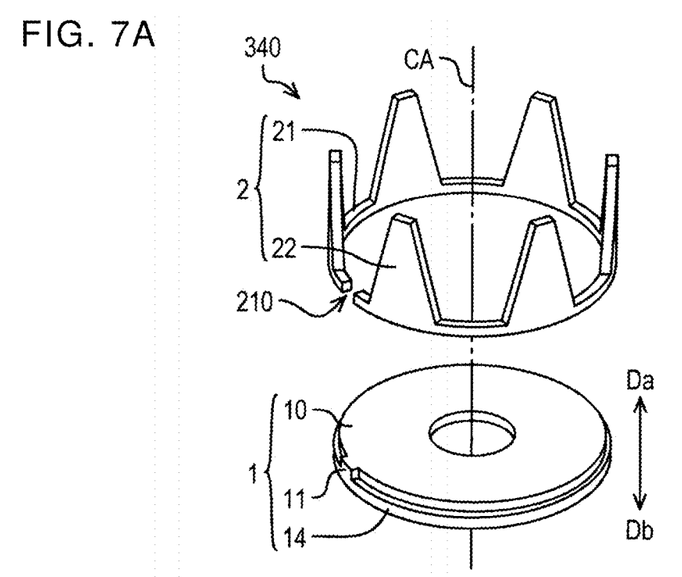
FIG. 7A is an exploded perspective view of a stator core according to a third modification of an example embodiment of the present disclosure.
Figure 7B:
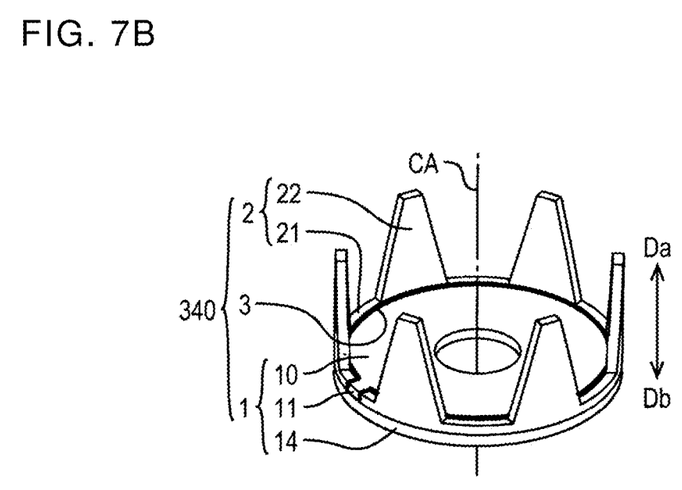
FIG. 7B is a perspective view of the stator core according to the third modification.

The third modification of the stator core 340 will be described with reference to FIGS. 7A and 7B. FIG. 7A is an exploded perspective view of the stator core 340 according to the third modification. FIG. 7B is a perspective view of the stator core 340 according to the third modification.

In the third modification, the disk portion 1 has a flange 14. The flange 14 extends radially outward at the radially outer end of the disk portion 1. More specifically, the flange 14 extends radially outward from a lower part of the radially outer surface of the disk body 10.

The pole-tooth yoke 2 is disposed along an upper part of the radially outer surface of the disk body 10. The radially inner end of the annular portion 21 is connected to the upper part of the radially outer surface of the disk body 10 via the joint portion 3. The axially-other-side end of the annular portion 21 contacts the axially-one-side end of the flange 14. With this configuration, when the stator core 340 is manufactured, the position of the pole-tooth yoke 2 with respect to the disk portion 1 in the axial direction can be determined by abutting the pole-tooth yoke 2 against the flange 14 in the axial direction.

In FIGS. 7A and 7B, the disk portion 1 has the first protrusion 11 that fits into the gap 210 of the pole-tooth yoke 2. The first protrusion 11 extends radially outward from the upper part of the radially outer surface of the disk body 10. The first protrusion 11 is disposed on the axially one side Da with respect to the flange 14. However, the present disclosure is not limited to the example shown in FIGS. 7A and 7B, and the disk portion 1 may not have the first protrusion 11.

1-3-4. Fourth Modification

Figure 8:
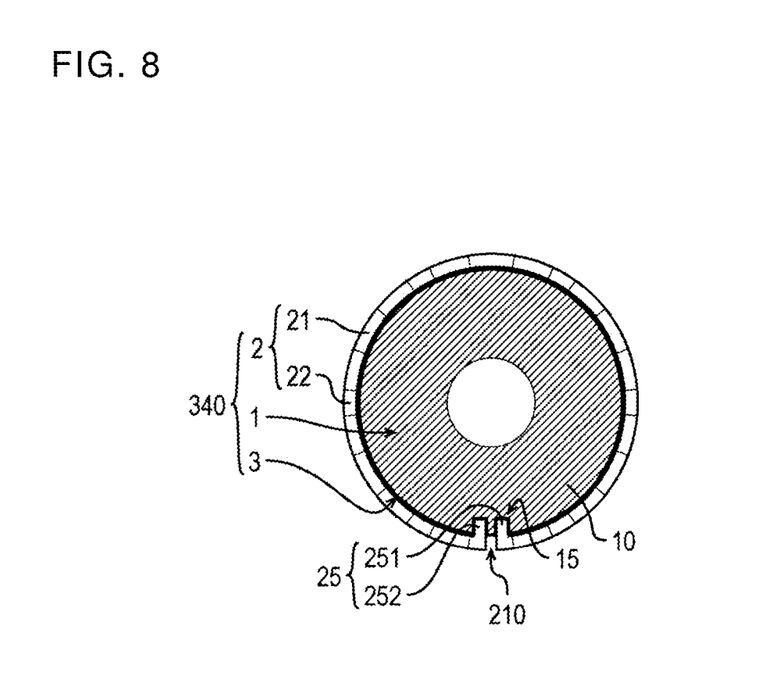
FIG. 8 is a top view of a stator core according to a fourth modification of an example embodiment of the present disclosure.

The fourth modification of the stator core 340 will be described with reference to FIG. 8. FIG. 8 is a top view of the stator core 340 according to the fourth modification.

In the fourth modification, the disk portion 1 has a side recess 15. The side recess 15 is recessed inward in the radial direction on the radially outer surface of the disk portion 1. In FIG. 8, the disk portion 1 has a plurality of side recesses 15. The two side recesses 15 are formed in the circumferential direction on the radially outer surface of the disk body 10. However, the present disclosure is not limited to the example shown in FIG. 8, and the number of the side recesses 15 may be one or three or more.

The annular portion 21 of the pole-tooth yoke 2 has an extension portion 25. The extension portion 25 extends radially inward at the circumferential end of the annular portion 21. The extension portion 25 fits into the side recesses 15. The extension portion 25 can be formed, for example, by bending the circumferential end of the annular portion 21 inward in the radial direction. With this configuration, the annular portion 21 can be more reliably positioned with respect to the disk portion 1 in the circumferential direction.

In the fourth modification, the extension portion 25 has a first extension portion 251 and a second extension portion 252. The first extension portion 251 extends radially inward at the first circumferential side end of the annular portion 21. The second extension portion 252 extends radially inward at the second circumferential side end of the annular portion 21. The first extension portion 251 and the second extension portion 252 are fitted into different side recesses 15. With this configuration, when the annular portion 21 is joined to the disk portion 1, both ends of the annular portion 21 in the circumferential direction can be fixed to the side recesses 15 of the disk portion 1, respectively. Therefore, when, for example, the annular portion 21 is joined along the radially outer surface of the disk portion 1, the annular portion 21 can be joined to the radially outer surface of the disk portion 1 without any gap on the entire circumference. Further, this configuration can prevent the generation of a gap between the annular portion 21 and the disk portion 1, even if the annular portion 21 bends. However, the present disclosure is not limited to the above example embodiment, and the extension portion 25 may have only one of the first extension portion 251 and the second extension portion 252.

The first to fourth modifications of the example embodiment have been described above. The first to fourth modifications may be implemented individually. Alternatively, a combination of at least two of the first to fourth modifications may be implemented.

2. Others

The example embodiment of the present disclosure has been described above. Note that the scope of the present disclosure is not limited to the above example embodiment. The present disclosure can be implemented by making various modifications to the abovementioned example embodiment without departing from the gist of the disclosure. In addition, the matters described in the above example embodiment can be arbitrarily combined together, as appropriate, as long as there is no inconsistency.

The present disclosure is useful in, for example, a motor including a stator that has a stator core in which pole teeth are disposed radially outward of a coil.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:
1. A stator core comprising:
a disk portion that has a disk shape extending in a radial direction about a central axis extending in a vertical direction; and
a pole-tooth yoke located along a radially outer end of the disk portion; wherein
the pole-tooth yoke includes:
an annular portion that is connected to the radially outer end of the disk portion and extends in a circumferential direction; and a pole tooth protruding to an axially one side from the annular portion; and the disk portion and the pole-tooth yoke are defined by different members.

2. The stator core according to claim 1, further comprising a joint portion where the annular portion is joined to the radially outer end of the disk portion by welding.

3. The stator core according to claim 1, wherein the pole-tooth yoke includes a gap between a first circumferential side end and a second circumferential side end of the annular portion.

4. The stator core according to claim 3, wherein
the disk portion includes a first protrusion that protrudes radially outward at the radially outer end; and
at least one of the first circumferential side end and the second circumferential side end of the annular portion is in contact with a circumferential end of the first protrusion.

5. The stator core according to claim 1, wherein
the pole-tooth yoke includes a plurality of the pole teeth arranged in the circumferential direction;
the disk portion includes a second protrusion that protrudes radially outward at the radially outer end; and
the second protrusion is located between the pole teeth adjacent to each other in the circumferential direction.

6. The stator core according to claim 5, wherein
the pole-tooth yoke includes a pole-tooth recess that is recessed in the circumferential direction at a circumferential end of the pole tooth; and
a circumferential end of the second protrusion fits into the pole-tooth recess.

7. The stator core according to claim 1, wherein
the annular portion includes a hole, the hole passing through the annular portion in the radial direction or being recessed radially outward at a radially inner end;
the disk portion includes a third protrusion that protrudes radially outward at the radially outer end; and
the third protrusion fits into the hole.

8. The stator core according to claim 7, wherein, as viewed in an axial direction, the hole is located on a second circumferential side with respect to a first circumferential side end of the pole tooth and on a first circumferential side with respect to a second circumferential side end of the pole tooth.

9. The stator core according to claim 1, wherein
the disk portion includes a flange that extends radially outward at the radially outer end; and
an axial side end of the annular portion is in contact with an axial side end of the flange.

10. The stator core according to claim 1, wherein
the disk portion includes a side recess that is recessed radially inward in a radially outer surface; and
the annular portion includes an extension portion extending radially inward at the circumferential end, the extension portion fitting into the side recess.

11. The stator core according to claim 10, wherein
the disk portion includes a plurality of the side recesses;
the extension portion includes a first extension portion extending radially inward at the first circumferential side end of the annular portion, and a second extension portion extending radially inward at the second circumferential side end of the annular portion; and
the first extension portion and the second extension portion fit into different side recesses of the plurality of side recesses.

12. A motor comprising:
a stator including the stator core according to claim 1; and
a rotor driven by the stator; wherein
the rotor includes a magnet located radially outward of the stator;
the stator further includes a coil located radially inward of the pole tooth of the stator core; and
the coil opposes the magnet in the radial direction via the pole tooth.

* * * * *